United States Patent
Bespalov et al.

(10) Patent No.: US 9,121,963 B2
(45) Date of Patent: Sep. 1, 2015

(54) DUAL MODE BALANCING IN OBM RESISTIVITY IMAGING

(71) Applicant: Baker Hughes Incorporated, Houston, TX (US)

(72) Inventors: Alexandre N. Bespalov, Houston, TX (US); Gregory B. Itskovich, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 67 days.

(21) Appl. No.: 14/098,178

(22) Filed: Dec. 5, 2013

(65) Prior Publication Data

US 2015/0160366 A1    Jun. 11, 2015

(51) Int. Cl.
*G01V 3/00* (2006.01)
*G01N 27/72* (2006.01)
*G01R 33/02* (2006.01)
*G01V 3/26* (2006.01)
(Continued)

(52) U.S. Cl.
CPC . *G01V 3/26* (2013.01); *E21B 47/12* (2013.01); *G01V 3/20* (2013.01); *G01V 3/00* (2013.01); *G01V 3/08* (2013.01); *G01V 3/18* (2013.01)

(58) Field of Classification Search
CPC .............. G01V 3/18; G01V 3/00; G01V 3/08
USPC .......... 324/366, 233, 324, 326, 332, 344, 347
See application file for complete search history.

(56) References Cited

U.S. PATENT DOCUMENTS 3,493,850 A    2/1970   Schuster
4,803,483 A *  2/1989   Vandervier et al. ........ 340/853.2
(Continued)

FOREIGN PATENT DOCUMENTS

EP    2629122 A2    8/2013

OTHER PUBLICATIONS

Schlumberger Brochure, "Borehole Imaging in Oil-Based Mud," (Jul. 2006); retrieved on Aug. 27, 2013 from http://www.slb.com/~/media/Files/evaluation/brochures/wireline_open_hole/geology/obmi_br.pdf.
(Continued)

*Primary Examiner* — Patrick Assouad
*Assistant Examiner* — Hoang X Nguyen
(74) *Attorney, Agent, or Firm* — Mossman Kumar & Tyler PC

(57) ABSTRACT

Methods, systems, and devices for evaluating an earth formation. Methods may include conveying the carrier into a formation borehole; and using measure electrodes, in one mode of measurement, to make current measurements by applying a voltage to each measure electrode in a first set of sensor arrays while making first current measurements; and applying another high frequency voltage to each measure electrode in a second set of sensor arrays while making second current measurements. Optionally, methods include using the measure electrodes, in another mode of measurement, to make further resistivity measurements by applying a voltage to each measure electrode in both sets of sensor arrays while making third current measurements. Methods include combining first current measurements, second current measurements, and third current measurements to simulate a virtual impedance for each measure electrode. Optionally, any two consecutive sensor arrays around the circumference of the tool body are in different sets.

16 Claims, 11 Drawing Sheets

(51) Int. Cl.
  E21B 47/12 (2012.01)
  G01V 3/20 (2006.01)
  G01V 3/18 (2006.01)
  G01V 3/08 (2006.01)

(56) References Cited

U.S. PATENT DOCUMENTS

| | | | |
|---|---|---|---|
| 4,820,989 A * | 4/1989 | Vail, III | 324/368 |
| 5,045,795 A | 9/1991 | Gianzero et al. | |
| 5,442,294 A | 8/1995 | Rorden | |
| 5,877,996 A | 3/1999 | Krokstad et al. | |
| 6,191,588 B1 * | 2/2001 | Chen | 324/367 |
| 6,348,796 B2 | 2/2002 | Evans et al. | |
| 6,765,386 B2 * | 7/2004 | Gianzero et al. | 324/367 |
| 6,984,983 B2 * | 1/2006 | Tabanou | 324/367 |
| 7,098,664 B2 | 8/2006 | Bittar et al. | |
| 7,119,544 B2 | 10/2006 | Hayman et al. | |
| 7,609,066 B2 * | 10/2009 | Wang | 324/367 |
| 8,030,937 B2 | 10/2011 | Hu et al. | |
| 8,237,445 B2 | 8/2012 | Bespalov et al. | |
| 8,299,796 B2 | 10/2012 | San Martin et al. | |
| 8,581,594 B2 * | 11/2013 | Wang et al. | 324/366 |
| 2002/0101236 A1 | 8/2002 | Wollin | |
| 2002/0153897 A1 | 10/2002 | Evans et al. | |
| 2003/0197510 A1 * | 10/2003 | Gianzero et al. | 324/367 |
| 2006/0267591 A1 | 11/2006 | Hayman | |
| 2007/0035306 A1 | 2/2007 | Forgang et al. | |
| 2007/0236222 A1 | 10/2007 | Gorek et al. | |
| 2009/0302854 A1 | 12/2009 | Forgang et al. | |
| 2010/0013487 A1 | 1/2010 | Bloemenkamp | |
| 2010/0114492 A1 | 5/2010 | Zhao et al. | |
| 2011/0227580 A1 | 9/2011 | Gold et al. | |
| 2012/0059616 A1 | 3/2012 | Zhao | |
| 2012/0326723 A1 * | 12/2012 | Bloemenkamp et al. | 324/356 |
| 2013/0013210 A1 | 1/2013 | Itskovich et al. | |
| 2013/0024120 A1 | 1/2013 | Bespalov et al. | |

OTHER PUBLICATIONS

Int'l Search Report & Written Opinion in PCT/US2014/066646, mailed Feb. 27, 2015.

* cited by examiner

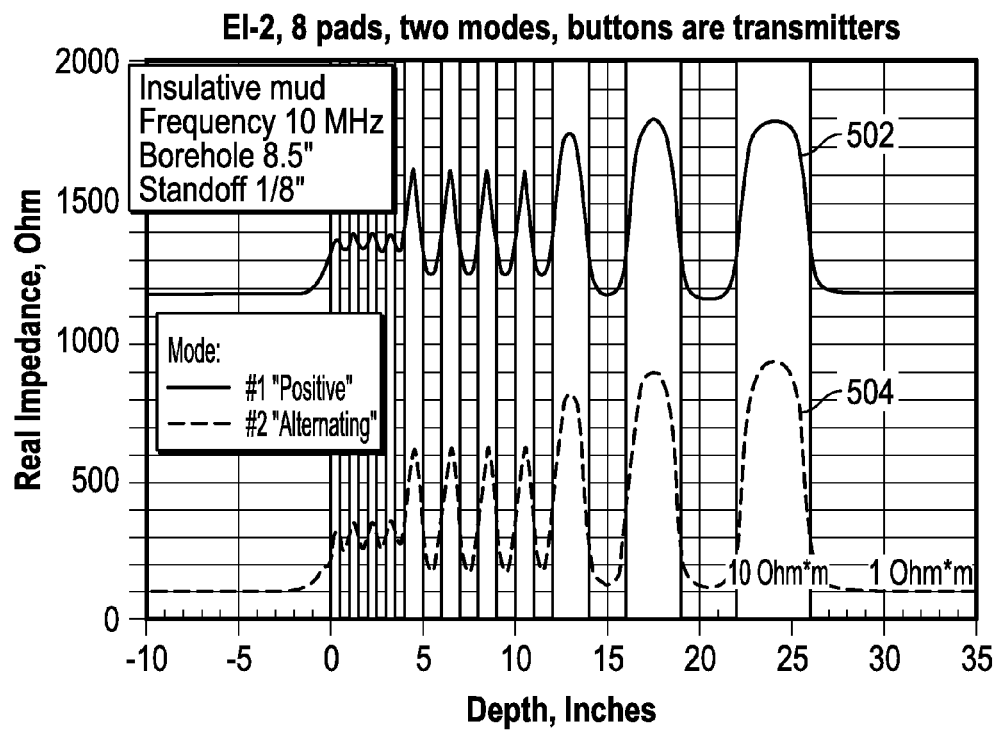
FIG. 5B
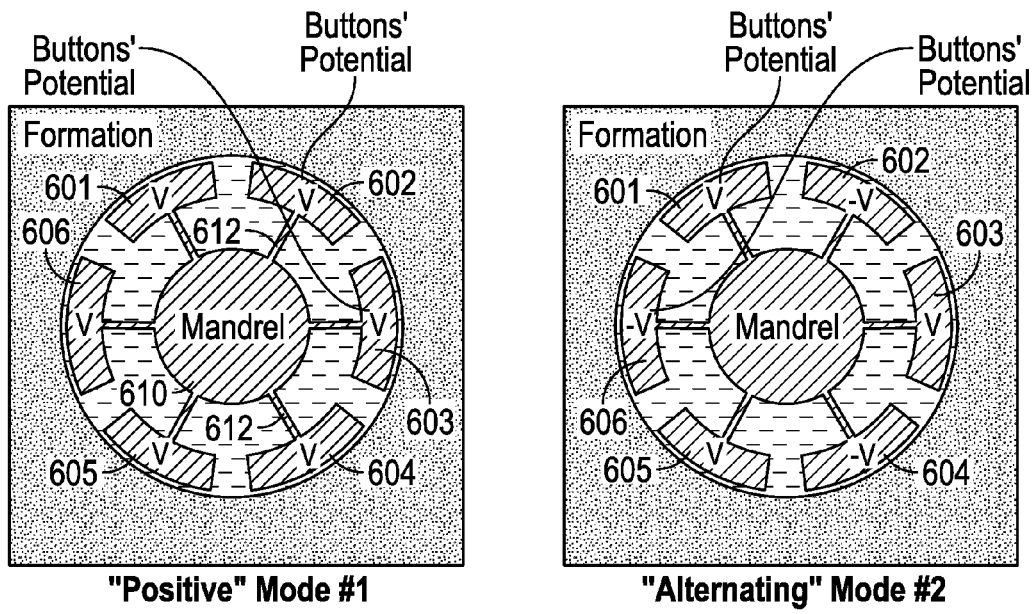
"Positive" Mode #1
FIG. 6A
"Alternating" Mode #2
FIG. 6B "Balanced" Mode #3

DUAL MODE BALANCING IN OBM RESISTIVITY IMAGING

FIELD OF THE DISCLOSURE

This disclosure generally relates to explorations for hydrocarbons involving electrical investigation of a borehole penetrating an earth formation. More specifically, this disclosure relates to a method and apparatus for producing an image by a resistivity tool in the borehole filled with oil-based mud.

BACKGROUND OF THE DISCLOSURE

Electrical earth borehole logging is well known, and various devices and techniques have been used for this purpose. Broadly speaking, there are two categories of devices used in electrical wellbore logging devices. In the first category galvanic electrodes are used to inject current into an earth formation, and then the current or voltage drop is measured by sensing electrodes to measure signals sensitive to formation electrical properties. In a second category inductive excitation by coils is used to induce currents within the formation, and then the magnitude and phase of the induced current is detected using also induction receiving antenna. The present invention belongs to the first category. Resistivity imaging tools have been in widespread use for several years for obtaining resistivity images of walls of boreholes drilled in an earth formation.

SUMMARY OF THE DISCLOSURE

In aspects, the present disclosure is related to evaluating an earth formation. Method embodiments may include evaluating an earth formation intersected by a borehole using a carrier associated with measure electrodes on a plurality of sensor arrays. The plurality of sensor arrays may include a first set of sensor arrays and a second set of sensor arrays. Each sensor array of the plurality of sensor arrays may include at least one measure electrode of the measure electrodes. Embodiments may include conveying the carrier into the borehole; and using the measure electrodes, in a first mode of measurement, to make first current measurements indicative of a resistivity parameter of the earth formation, wherein the first current measurements are made by applying a first voltage to each measure electrode in the plurality of sensor arrays while making the first current measurements; and using the measure electrodes, in a second mode of measurement, to make further current measurements indicative of the resistivity parameter of the earth formation, comprising: applying a second voltage to each measure electrode in the first set of sensor arrays while making second current measurements; and applying a third voltage that is the opposite polarity of the second voltage to each measure electrode in the second set of sensor arrays while making third current measurements; and combining the first current measurements, the second current measurements, and the third current measurements to simulate a virtual impedance for each measure electrode.

For some embodiments, for any two consecutive sensor arrays around the circumference of the carrier, one of the consecutive sensor arrays is in a different set than the other of the consecutive sensor arrays is in. Methods may include using the virtual impedance for each measure electrode to estimate the resistivity parameter, or using the virtual impedance for each measure electrode to generate an image of the resistivity parameter. The first voltage, the second voltage, and the third voltage may each be applied at a frequency of at least 1 MHz. Applying the second voltage and applying the third voltage may occur at the same time. The first voltage may be the same as the second voltage.

Apparatus embodiments may include a logging tool configured to be conveyed in a borehole; a plurality of sensor arrays, including a first set of sensor arrays and a second set of sensor arrays, wherein each sensor array includes at least one measure electrode; a plurality of pads on the logging tool, wherein each pad comprises a pad body and at least one sensor array of the plurality of sensor arrays; and at least one processor configured to carry out methods described herein. For example, the processor may be configured to use the measure electrodes on the plurality of sensor arrays, in a first mode of measurement, to make first current measurements indicative of a resistivity parameter of the earth formation, wherein the first current measurements are made by applying a first voltage to each measure electrode in the plurality of sensor arrays while making the first current measurements; use the measure electrodes on the plurality of sensor arrays, in a second mode of measurement, to make further current measurements indicative of the resistivity parameter of the earth formation, comprising: applying a second voltage to each measure electrode in the first set of sensor arrays while making second current measurements; and applying a third voltage that is the opposite polarity of the second voltage to each measure electrode in the second set of sensor arrays while making third current measurements; and combine the first current measurements, the second current measurements, and the third current measurements to simulate a virtual impedance for each measure electrode.

For some embodiments, for any two consecutive sensor arrays around the circumference of the carrier, one array is in a different set than the other array is in. The at least one processor may be further configured to use the virtual impedance for each measure electrode to provide an image of the resistivity parameter. The at least one processor may be configured to apply each of the first voltage, the second voltage, and the third voltage at a frequency of at least 1 MHz. The at least one processor may be configured to apply the second voltage and the third voltage at the same time. The first voltage may be the same as the second voltage.

Apparatus embodiments may include a drill bit conveyed on a bottom hole assembly (BHA) for drilling the borehole; a tool body associated with the BHA; a plurality of sensor arrays on the tool body, including a first set of sensor arrays and a second set of sensor arrays, wherein each sensor array includes at least one measure electrode; and at least one processor configured to carry out methods described herein. For example, the processor may be configured to use the measure electrodes on the plurality of sensor arrays, in a first mode of measurement, to make first current measurements indicative of a resistivity parameter of the earth formation, wherein the first current measurements are made by applying a first voltage to each measure electrode in the plurality of sensor arrays while making the first current measurements; use the measure electrodes on the plurality of sensor arrays, in a second mode of measurement, to make further current measurements indicative of the resistivity parameter of the earth formation, comprising: applying a second voltage to each measure electrode in the first set of sensor arrays while making second current measurements; and applying a third voltage that is the opposite polarity of the second voltage to each measure electrode in the second set of sensor arrays while making third current measurements; and combine the first current measurements, the second current measurements, and the third current measurements to simulate a virtual impedance for each measure electrode.

For some embodiments, for any two consecutive sensor arrays around the circumference of the carrier, one array is in a different set than the other array is in. The at least one processor may be further configured to use the virtual impedance for each measure electrode to provide an image of the resistivity parameter. The at least one processor may be configured to apply each of the first voltage, the second voltage, and the third voltage at a frequency of at least 1 MHz. The at least one processor may be configured to apply the second voltage and the third voltage at the same time. The first voltage may be the same as the second voltage.

Alternative method embodiments may include conveying the carrier into the borehole; and using the measure electrodes to make current measurements indicative of the resistivity parameter of the earth formation, comprising: applying a first voltage to each measure electrode in the first set of sensor arrays while making first current measurements; and applying a second voltage that is the opposite polarity of the first voltage to each measure electrode in the second set of sensor arrays while making second current measurements.

For some embodiments, for any two consecutive sensor arrays around the circumference of the carrier, one of the consecutive sensor arrays is in a different set than the other of the consecutive sensor arrays is in. Methods may include using the virtual impedance for each measure electrode to estimate the resistivity parameter, or using the virtual impedance for each measure electrode to generate an image of the resistivity parameter. The first voltage and the second voltage may each be applied at a frequency of at least 1 MHz. Applying the first voltage and applying the second voltage may occur at the same time. The first voltage may be the same as the second voltage. Some embodiments may include using the first measurements and second measurements to generate an image of the resistivity parameter.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 5A and 5B illustrate a numerical simulation of measured impedance for the horizontal layered model;

FIGS. 6A and 6B illustrate a schematic cross section of a downhole tool according to embodiments of the present disclosure;

DETAILED DESCRIPTION

Figure 1:
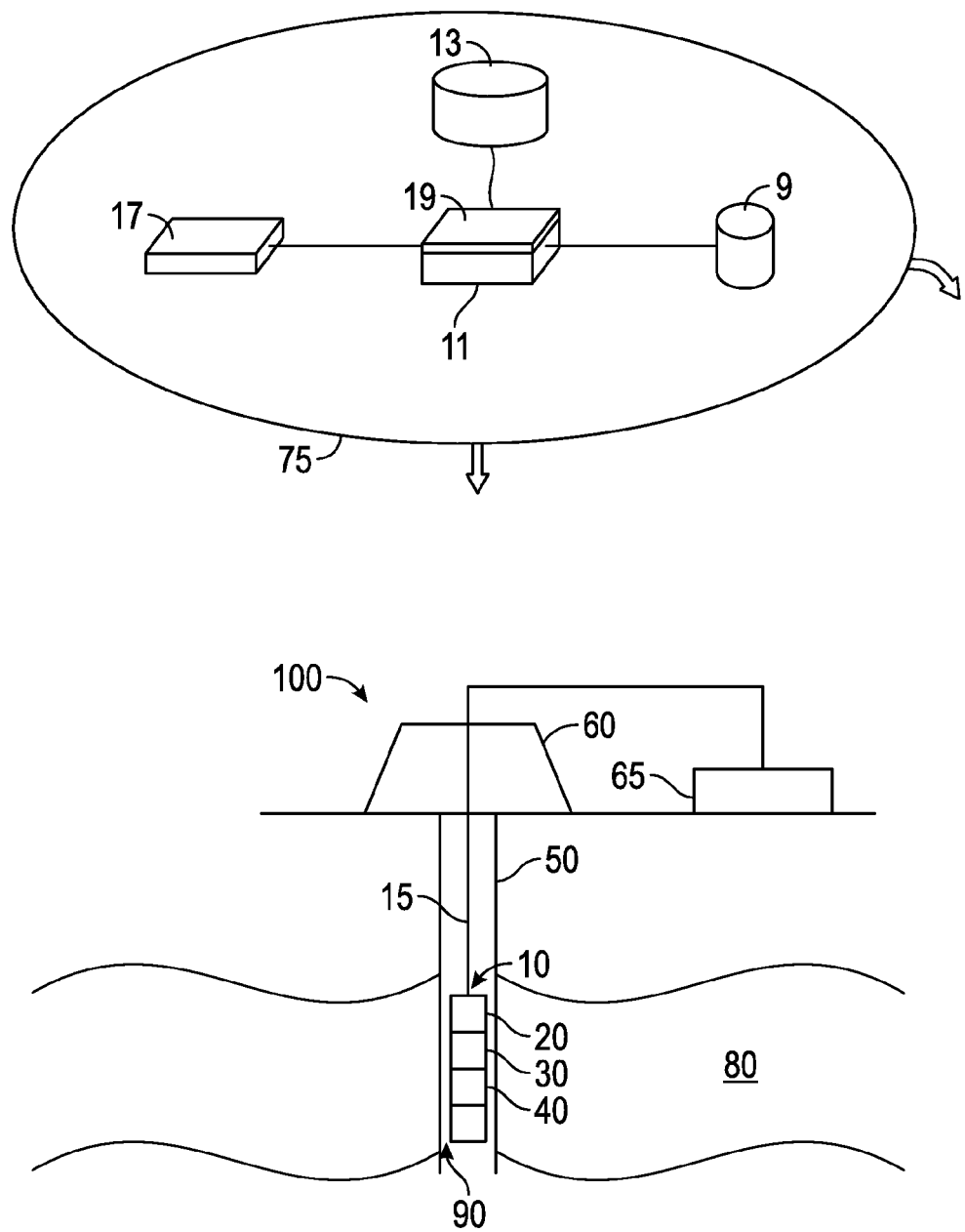
FIG. 1 shows an exemplary imaging tool suspended in a borehole in accordance with embodiments of the present disclosure.

In aspects, this disclosure relates to galvanic resistivity imaging of an earth formation surrounding a borehole. In other aspects, this disclosure relates to estimating a parameter of interest, such as, for example, a resistivity of the earth formation. Illustrative methods for estimating resistivity may include the acquiring and utilization of information characterizing resistivity of the formation. This information may be acquired by tools deployed into the borehole. For context, an exemplary system for deploying and using such tools to acquire this information is described below.

It is a technical challenge to obtain sufficiently accurate information at a resolution sufficient for imaging while logging in a high temperature and high pressure borehole environment. Historically, galvanic imaging tools include at least one current transmitter which introduces current into the formation and at least one return electrode at which current returns through the mandrel to the tool. Resistance (or complex impedance) may be measured between the two electrodes. Ideally, current flows directly from the current transmitter through the earth formation and returns through the return electrode. In some downhole situations, however, the resistivity tool is separated from the formation by a gap filled with oil-based drilling fluid ('mud'). The gap may be uniform along the length of the borehole or may experience variations due to borehole rugosity.

Oil has a high electrical resistivity, and is thus problematic for galvanic-type devices. The best situation for the galvanic measurements would be if all electric current lines would close within the pads ("on-pad"). But, in a case of low-resistive formation (~1 ohm-m) and big standoff (>1 mm), a significant amount of the current leaks to the mandrel through the formation. It is "a favorable path" due to large mandrel area (in comparison with the pads) and low formation resistivity. This leakage is an undesirable phenomenon decreasing the measured currents and adding parasite terms to the measured impedance. Thus, the values of measured impedances are affected by the mud, borehole rugosity, and mandrel.

General embodiments in accordance with the invention may include a method for evaluating an earth formation intersected by a borehole using a carrier associated with a plurality of sensor arrays. The method may include using measure electrodes in the plurality of sensor arrays, in a first mode of measurement, to make resistivity measurements by applying a first high frequency voltage of the same polarity to each measure electrode in the first set of sensor arrays and applying a second high frequency voltage of the opposite polarity to each measure electrode in the second set of sensor arrays. The first and second set of arrays may alternate around the circumference of the carrier, so that no two consecutive arrays are in the same set. In a second mode, measurements may be taken with all measure electrodes at the same high frequency voltage. In some aspects, novel processing may combine measurements from the first and second mode to simulate a virtual "balanced" mode of measurement.

FIG. 1 schematically illustrates a resistivity imaging system 100 having a downhole tool 10 configured to acquire information for producing a resistivity image of the earth formation 80 or another parameter of interest of a formation 80. The system 100 may include a conventional derrick 60 erected on a derrick floor 70. A conveyance device (carrier 15) which may be rigid or non-rigid, may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit. Drilling fluid ('mud') 90 may be present between the formation 80 and the downhole tool 10, such that drilling fluid 90 affects the value of resistivity measurements obtained from the formation.

A surface control unit or controller 65 receives signals from downhole sensors 40 and other sensors used in the system 100 and processes such signals according to programmed instructions provided to the surface control unit 65. The surface control unit 65 may display desired parameters and other information on a display/monitor that is utilized by an operator. The surface control unit 65 may be a computer-based unit that may include a information processing device 75. The surface control unit 65 may further communicate with a downhole control unit 20 at a suitable location on downhole tool 10. The surface control unit 65 may process data relating to the operations and data from the sensors 40, and may control one or more downhole operations performed by system 100.

In one embodiment, electronics 30 associated with sensors 40 may be configured to record and/or process the information obtained. To perform the treatments during a single trip, the tool may use a "high bandwidth" transmission to transmit the information acquired by sensors 40 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

A point of novelty of the system illustrated in FIG. 1 is that the surface control unit 65 and/or the downhole control unit 20 are configured to perform certain methods (discussed below) that are not in the prior art. Surface control unit or downhole control unit may be configured to control sensors described above and to estimate a parameter of interest according to methods described herein. Control of these components may be carried out using one or more models using methods described below.

Figure 2:
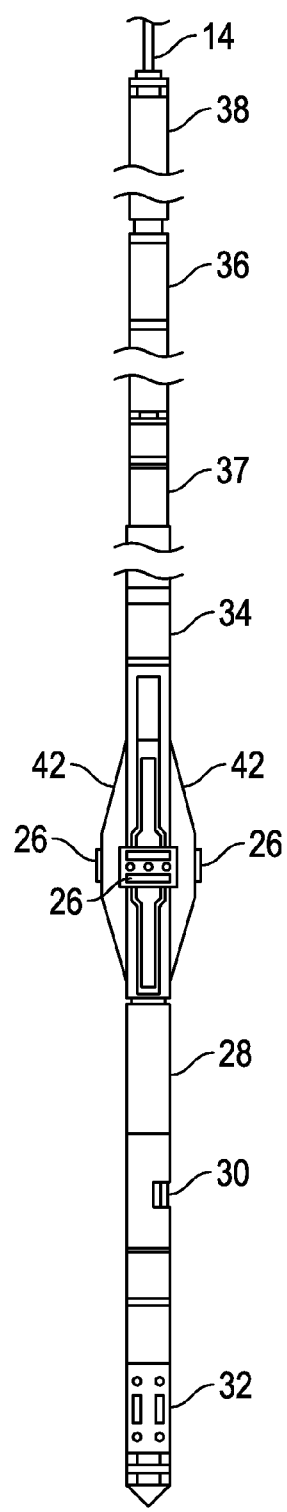
FIG. 2 is a schematic external view of a borehole imager system in accordance with embodiments of the present disclosure.

FIG. 2 is a schematic external view of a borehole imager system. The tool 10 comprising the imager system includes sensors 40, comprising resistivity arrays 26. Optionally, the imager system may include other sensors, such as a mud cell 30 or a circumferential acoustic televiewer 32. Electronics modules 28 and 38 may be located at any suitable locations in the system and not necessarily in the locations depicted. The components may be mounted on a mandrel 34 in a conventional well-known manner. The outer diameter of the assembly may be about 5 inches and about fifteen feet long. An orientation module 36 including a magnetometer and an accelerometer or inertial guidance system may be mounted above the imaging assemblies 26 and 32. The upper portion 38 of the tool 10 may contain a telemetry module for sampling, digitizing and transmission of the data samples from the various components uphole to surface control unit 65 in a conventional manner. If acoustic data are acquired, they may be digitized or the data may be retained in analog form for transmission to the surface for later digitization by surface control unit 65.

Figure 3A:
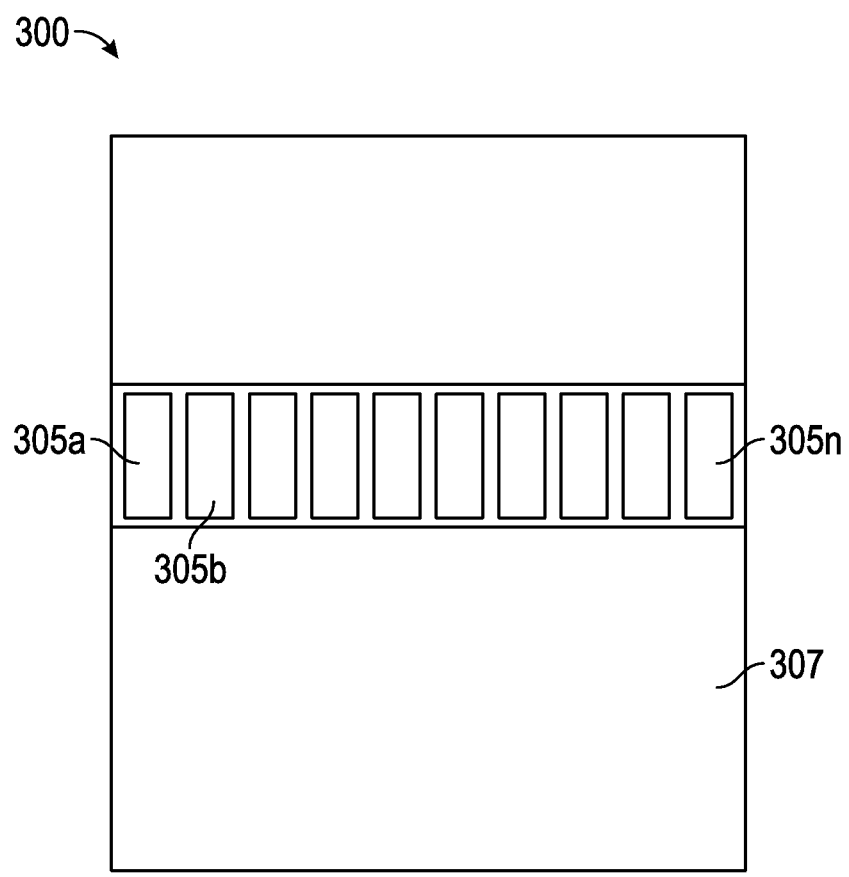
FIG. 3A illustrates a high frequency two-terminal sensor array for a galvanic imager used to obtain a plurality of resistance measurements of a formation in a borehole in accordance with embodiments of the present disclosure.

FIG. 3A illustrates a high frequency two-terminal sensor array 350 for a galvanic imager used to obtain a plurality of resistance measurements of a formation in a borehole in accordance with embodiments of the present disclosure. The array 350 includes measure electrodes $305a, 305b, \ldots, 305n$. In the illustration of FIG. 3, the measure electrodes are placed azimuthally. This is not meant as a limitation of the disclosure. In another aspect, a plurality of vertically displaced measure electrodes may correspond to the vertically displaced current electrodes. In yet another aspect, the plurality of measure electrodes may include a combination of vertically and azimuthally displaced measure electrodes. Other electrode configurations using circular button electrodes may be used. All such embodiments are within the scope of the present disclosure.

In normal operation, high-frequency voltage V is applied between the measure electrodes and pad body 307. Each measure electrode $305a, 305b, \ldots, 305n$ (i.e., "button") is operatively coupled with a phase-sensitive analyzer measuring the complex-valued current $J_i$. The real part of the apparent impedance $V/J_i$ may be attributed to formation resistivity in front of the measure electrode.

When a combination of a significant standoff gap between the pad and the borehole wall (e.g., greater than 1 mm) and a low-resistive formation (e.g., approximately 1 ohm-m) are present, a significant amount of the current leaks "off-pad" to the mandrel. This leakage is an undesirable phenomenon decreasing the measured currents $J_i$ and adding parasitic terms to the estimated impedance. The latter contingence leads to deterioration of the signal dynamic range.

Figure 3B:
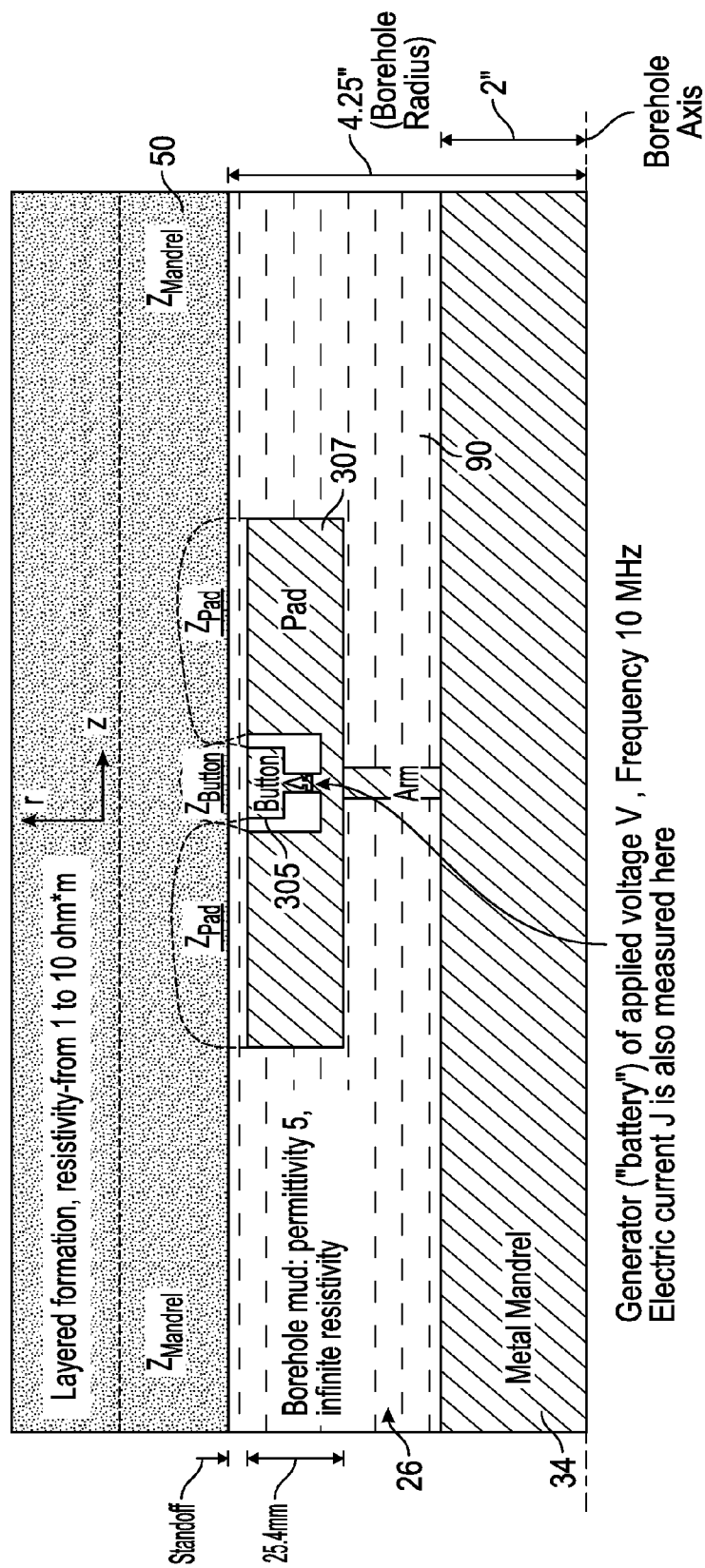
FIG. 3B illustrates a schematic view of sensor array in accordance with embodiments of the present disclosure.

FIG. 3B illustrates a schematic view of sensor array 350 in accordance with embodiments of the present disclosure. Sensor array is coupled to and supported from the mandrel 34 by respective support members (arms) 42. A high-frequency voltage V is applied between measure electrodes 305 and the pad body 307, so that electric current is excited. Upon leaving the electrode 305, current travels through a variable pad-formation standoff gap, then through the near-button part of the formation to return to ground (e.g., other metal components). The current may travel by two parallel paths. The first path is through the "near" formation zone to a pad body 307. The second path is through the "far" zone to the mandrel 34 ("off-pad").

Figure 4:
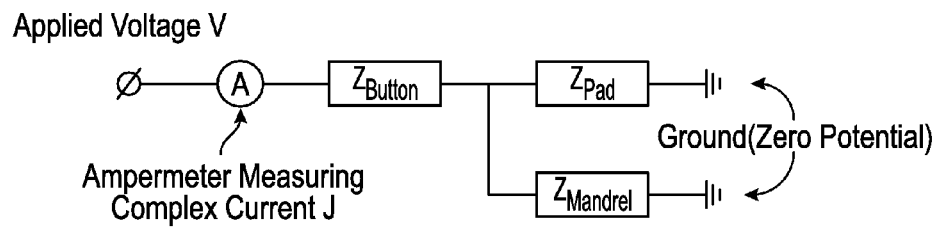
FIG. 4 illustrates equivalent circuits for the measurement circuit of the tool, mud, and formation.

FIG. 4 illustrates equivalent circuits for the measurement circuit of the tool, mud, and formation. FIG. 4 represents a single pad and single measure electrode (also known as a "button"), as in the traditional aligned mode, wherein the voltage V applied is the same for all pads. The first parameter of interest estimated is the real component of the impedance, Re $Z_{Button}$, which is estimated using $$\text{Re}\frac{V}{J},$$

which may be calculated for the normal or positive mode as:

$$\text{Re}\frac{V}{J} = \text{Re}Z_{Button} + \frac{(\text{Re}Z_{Pad})^2 \text{Re}Z_{Mandrel} + \text{Re}Z_{Pad}(\text{Re}Z_{Mandrel})^2 +}{(\text{Re}Z_{Pad} + \text{Re}Z_{Mandrel})^2 + (\text{Im}Z_{Pad} + \text{Im}Z_{Mandrel})^2}.$$

This illustrates that the desired value is additively contaminated by the parasitic term (a second term in the formula above). The ratio between the value to be estimated and the parasitic term depends on the pad-formation standoff, formation resistivity, and the mandrel length. The modulus of $Z_{mandrel}$ may be significantly higher than the modulus of $Z_{pad}$ if any of the following are true: i) the standoff gap is very small (e.g., less than 0.1 mm), ii) formation resistivity is high (e.g., greater than 10 ohm-m), or iii) the mandrel is short (e.g., less than 5 meters). In that case, the leakage to mandrel is naturally small, and we have:

$$\text{Re}\frac{V}{J} \approx \text{Re}Z_{Button} + \text{Re}Z_{Pad}.$$

The relative contamination is proportional to the ratio between the front areas of the electrodes(s) and of the pad. In this case the ratio is about 0.2, and thus the contamination is tolerable. Often, however, none of above conditions are satisfied. For example, if the pad-formation standoff exceeds a threshold value, the corresponding capacitive coupling becomes weaker than the mandrel-formation coupling due to the greater size of the mandrel area in comparison with the pads. If, simultaneously, the formation is low-resistive, it may be likely that $|Z_{Mandrel}| << |Z_{Pad}|$ but Re $Z_{Mandrel}$ >> Re $Z_{Pad}$ (due to the skin effect).

This scenario, that takes place in the positive mode, is not desirable for the measurements since the main part of the electric current returns through the mandrel, but not through the sensing buttons. In this case the real part of impedance is contaminated by the impedance of the mandrel:

$$\text{Re}\frac{V}{J} \approx \text{Re}Z_{Button} + \text{Re}Z_{Mandrel},$$

and the parasitic second term is relatively large.

Figure 5A:
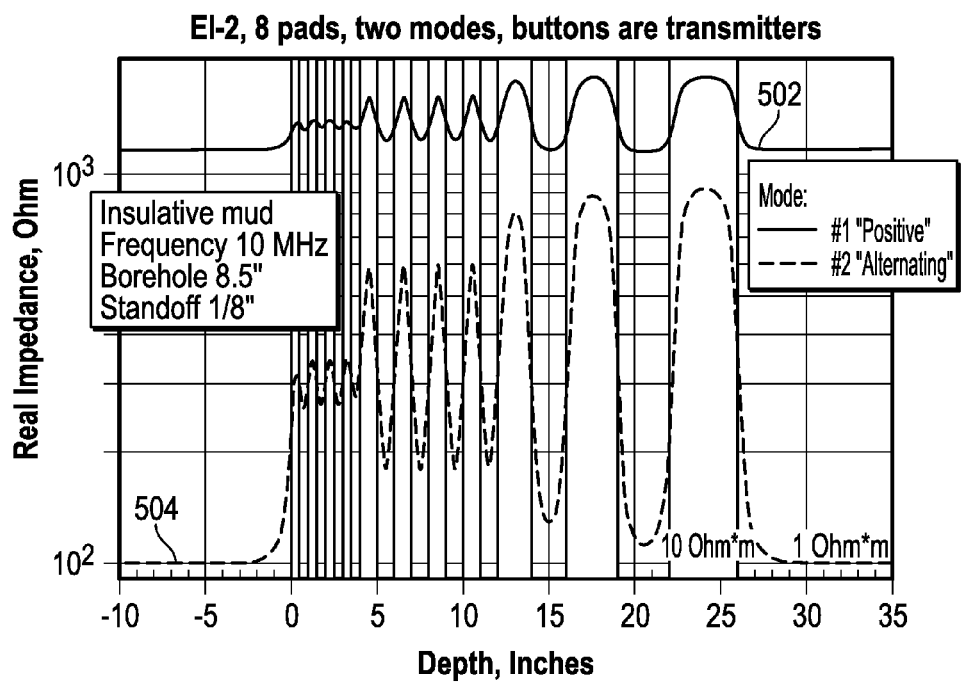

FIGS. 5A and 5B illustrate a numerical simulation of measured impedance Re $Z_{Button,i}$ using ("positive") mode 502 for the horizontal layered model. FIG. 5A is in the logarithmic scale; FIG. 5B is in the linear scale. It may be readily seen that the parasitic term is considerable, resulting in significant deterioration of the signal dynamic range.

Figure 7:
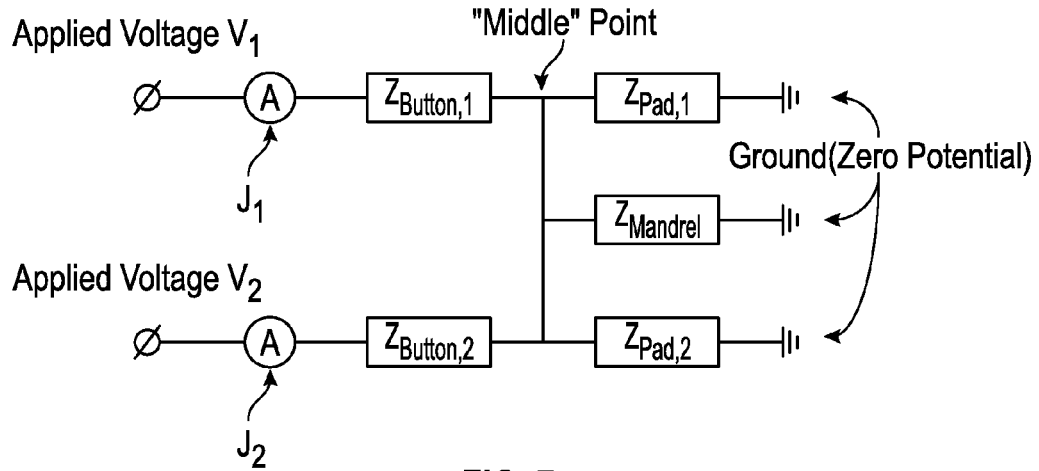
FIG. 7 illustrates equivalent circuits for the measurement circuit of the tool, mud, and formation for the alternating mode.

By mitigating the parasitic term, the signal dynamic range may be improved sufficiently to enable absolute measurements of the formation resistivity. This is enabled using a second pad in the system and a novel "alternating" measurement mode. The corresponding equivalent circuit is depicted in FIG. 7 (wherein the subscript refers to a button identifier). In the alternating measurement mode, instead of applying the same voltage to both pads (as in the "positive" mode), the device is configured such that the two voltages are oppositesigned: V for pad 1 and −V for pad 2. It is readily apparent that, if $Z_{Button,1} = Z_{Button,2}$ then the leakage to the mandrel (as well as to pads) is zero, the potential of the middle point at the circuit (corresponding to a boundary of the near-button zone in FIG. 3B) is zero, and the measurement provides an exact value of $Z_{Button,1}$, $Z_{Button,2}$ that is free of the parasite term. When these two impedances are not exactly equal the leakage becomes non-zero; but, if they are close to each other, it is much less than in the positive mode, so the contamination of measurements by the parasite term is mitigated.

In a general case of arbitrary (may be highly different) $Z_{Button,1}$, $Z_{Button,2}$, the alternating mode "per se" may be unable to provide their exact values. This problem is solved by the following method (called "the dual-mode balancing"): the measurements are made both on the positive mode #1:

$V_1^{(1)} = V_2^{(1)} = V;\ J_1^{(1)}$ and $J_2^{(1)}$ are measured;

and on alternating mode #2:

$V_1^{(2)} = -V_2^{(2)} = V;\ J_1^{(2)}$ and $J_2^{(2)}$ are measured wherein the superscript is the mode number. Then a virtual "balanced" mode #3 is defined, which is a linear combination of the positive and alternating modes:

$$\text{mode}\#3 = \text{mode}\#2 + a \cdot \text{mode}\#1, \quad (2.1)$$

and satisfies the condition:

$$J_1^{(3)} + J_2^{(3)} = 0. \quad (2.2)$$

Thus, from (2.1)-(2.2), we have the following formula for the complex-valued coefficient a:

$$a = -\frac{J_1^{(2)} + J_2^{(2)}}{J_1^{(1)} + J_2^{(1)}}. \quad (2.3)$$

Condition (2.2) means that there are no electric currents from the middle point in FIG. 7 to the ground through the pads or the mandrel. That is, the potential of this point is exact zero, so the values of $Z_{Button,1}$, $Z_{Button,2}$ are exactly:

$$Z_{Button,1} = \frac{V_1^{(3)}}{J_1^{(3)}} = \frac{(1+a)V}{J_1^{(2)} + aJ_1^{(1)}}, \quad (2.4)$$

$$Z_{Button,2} = \frac{V_2^{(3)}}{J_2^{(3)}} = \frac{(-1+a)V}{J_2^{(2)} + aJ_2^{(1)}}.$$

Note that the denominators here are just opposite to each other (see (2.2)), so the difference between $Z_{Button,1}$ and $Z_{Button,2}$ "sits in the numerators." Let us now apply the approach presented above to the tool with plurality of pads. The pads are divided into two groups: the odd-numbered and the even-numbered (see FIG. 6A and FIG. 6B). That is, both neighbors of any pad belong to another group. The measurements of the outgoing currents $J_i^{(mode\ number)}$ are done on the positive mode #1, when all buttons on all pads have the same potential V, and then on the alternating mode #2, when all buttons on the "odd" pads have again the potential V while all buttons on the "even" pads have the opposite potential, −V. The balanced mode #3 is defined by the same relation (1) and the condition $$\sum_{i=1}^{N} J_i^{(3)} = 0 \qquad (2.5)$$

where N is the total number of the buttons (in the current EI-2 design N=60). Thus, formula (2.3) for the complex-valued coefficient a turns into:

$$a = -\frac{\sum_{i=1}^{N} J_i^{(2)}}{\sum_{i=1}^{N} J_i^{(1)}} \qquad (2.6)$$

and formulas (4) for the near-button impedances take the form:

$$Z_{Button,i} = \frac{V_i^{(3)}}{J_i^{(3)}} = \frac{(\text{sign}_i + a)V}{J_i^{(2)} + aJ_i^{(1)}}, \qquad (2.7)$$

where $\text{sign}_i = 1$ at the "odd" pads and $\text{sign}_i = -1$ at the "even" ones. By analyzing the electric current pattern on the balanced mode we notice that unless the leakage to the pad bodies and to the mandrel is negligibly small, the current flows "radially-and-azimuthally" from electrodes of the "odd" pads to electrodes of the "even" ones (see FIG. 8). Thus, in this mode, the tool is neither "on-pad" nor "off-pad"—it is "cross-pad".

FIGS. 6A and 6B illustrate a schematic cross section of a downhole tool according to embodiments of the present disclosure. Downhole tool 600 comprises a mandrel 610 having six high-frequency imager sensor arrays (601-606) supported from the mandrel 610 by respective support members (arms) 612. Referring to FIG. 6A, in a first method embodiment, measurements are produced in an "alternating measurement mode," wherein the respective voltages applied to any two consecutive sensor arrays are different, but the respective voltages applied to alternating sensor arrays are the same. That is, arrays are divided into two groups: in the first group are the odd-numbered arrays, and in the second group are the even-numbered arrays. Both neighbors of any array belong to another group.

In some implementations, the respective voltages applied to consecutive sensor arrays are opposite. By opposite voltage, it is meant that one voltage is negative and one is positive, but the absolute value of each voltage is substantially the same. All odd-numbered pads operate with an applied voltage V while all even-numbered pads operate with the opposite-sign voltage, −V. For example, sensor arrays 601, 603 and 605 have a voltage value V, but sensor arrays 602, 604 and 606 have a voltage value −V. As a result, the residual leakage to mandrel is proportional to the imbalance in capacitive coupling between these two sets of pads. Thus, the leakage is much less than if all pads had the same potential V ("aligned measurement mode", FIG. 6B).

In a second technique, measurements may be taken in each of the alternating measurement mode and in the aligned measurement mode. Resistivity values may then be estimated using both measurements by virtually combining the measurements to simulate a "balanced mode," wherein the total outgoing current through all buttons is zero, i.e. the leakage is exactly zero. In addition to cancelling current leakage, the simulated measurements of the balanced mode also correct azimuthal image artifacts caused by an uneven pad-formation standoff.

Figure 8:
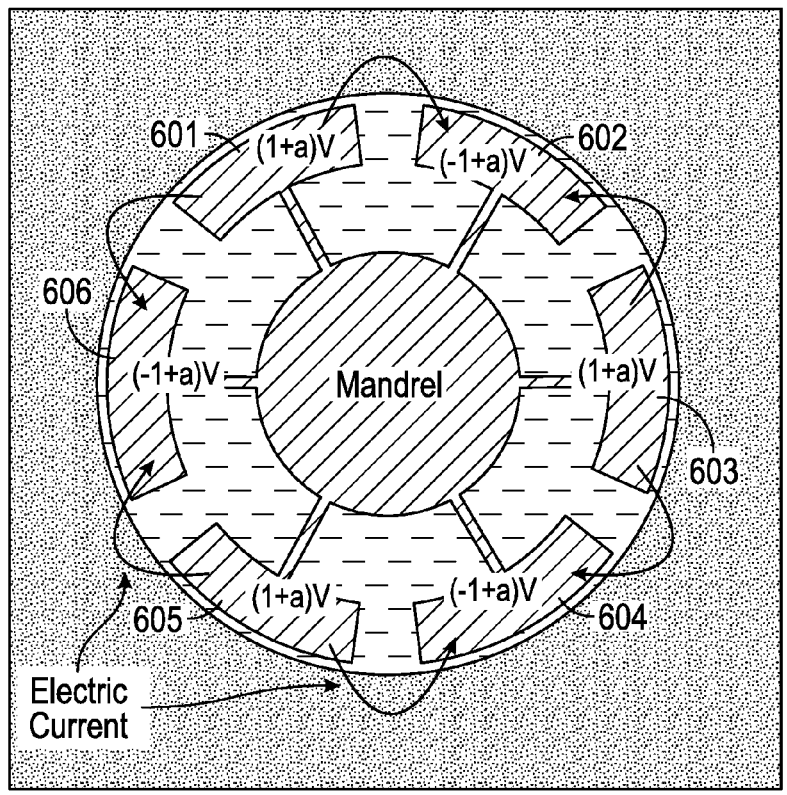
FIG. 8 shows current flow of the tool in operation in accordance with embodiments of the present disclosure.

Condition (X) means that there are no electric currents from the middle point in FIG. 8 to the ground through the pads or the mandrel. That is, the potential of this point is exact zero, so the values of $Z_{button1}, Z_{button2}$ are exactly:

$$Z_{Button,1} = \frac{V_1^{(3)}}{J_1^{(3)}} = \frac{(1+a)V}{J_1^{(2)} + aJ_1^{(1)}}, Z_{Button,2} = \frac{V_2^{(3)}}{J_2^{(3)}} = \frac{(-1+a)V}{J_2^{(2)} + aJ_2^{(1)}}.$$

The measurements of the outgoing currents $J_i$ are done on the aligned mode, when all electrodes on all pads have the same potential V, and then again in the alternating mode. The balanced mode is defined by the same relation (1) and the condition $$\sum_{i=1}^{N} J_i^{(3)} = 0$$

where N is the total number of the buttons (in the current EI-2 design). Thus, formula (3) for the complex-valued coefficient a becomes:

$$a = -\frac{\sum_{i=1}^{N} J_i^{(2)}}{\sum_{i=1}^{N} J_i^{(1)}}$$

and formulas (X) for the near-button impedances take the form:

$$Z_{Button,i} = \frac{V_i^{(3)}}{J_i^{(3)}} = \frac{(\text{sign}_i + a)V}{J_i^{(2)} + aJ_i^{(1)}},$$

where $\text{sign}_i = 1$ at the "odd" pads and $\text{sign}_i = -1$ at the "even" pads.

Current flows radially-and-azimuthally from electrodes of the "odd" pads to electrodes of the "even" pads (see FIG. 8).

Instead of opposite sign alternating, any other equivalent basis can be used to construct the balanced mode. For example, the first set of the measurements can be done for a potential V on the "odd" pads and zero potential on the "even" pads, and the second set of measurements may be reversed. However, using opposite sign alternating measurement in combination with the aligned measurement may be advantageous because each measurement is sufficient to provide an image alone.

The simulated virtual tool includes eight pads each having azimuthal size 39.375°. Use of an eight-pad tool avoids numerical artifacts in the simulation. First, the simulation was done for the benchmark comprising a 1 ohm-m formation with 10 ohm-m layers with thicknesses increasing from 0.5 inches to 4 inches.

The simulation uses the following parameters:
embedding formation 1 ohm-m;
horizontal layers of formation 10 ohm-m;
horizontal layer thicknesses 0.5-4 inches;

standoff ⅛ inches;
mandrel length 20 m;
mud conductivity 0;
frequency 10 MHz.

Returning to the simulation of measured impedance Re $Z_{Button,i}$ using the alternating mode 504 shown in FIGS. 5A and 5B, it is readily apparent that the alternating mode of the present disclosure greatly improves the tool's vertical resolution with respect to the same-potential measurements: the dynamic range (the max/min ratio) increased from 1.6 to 9. We also see that the parasitic term is almost a constant throughout the log.

Figure 9A:
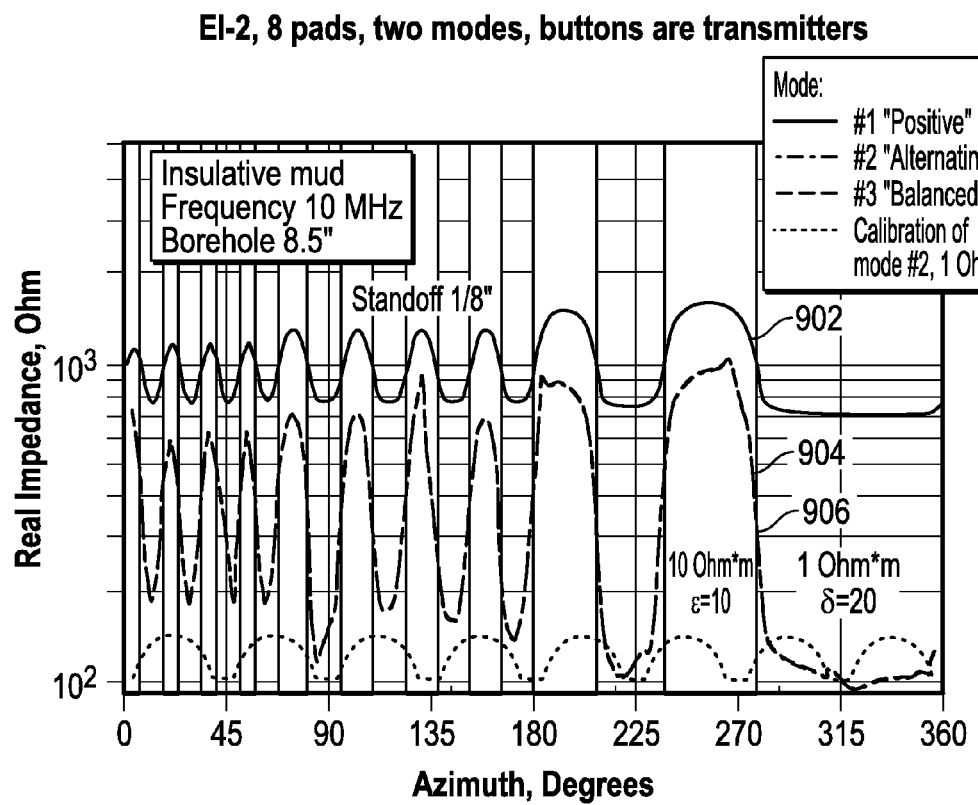
FIGS. 9A and 9B illustrate a numerical simulation of measured impedance illustrating azimuthal resolution according to embodiments of the present disclosure.
Figure 9B:
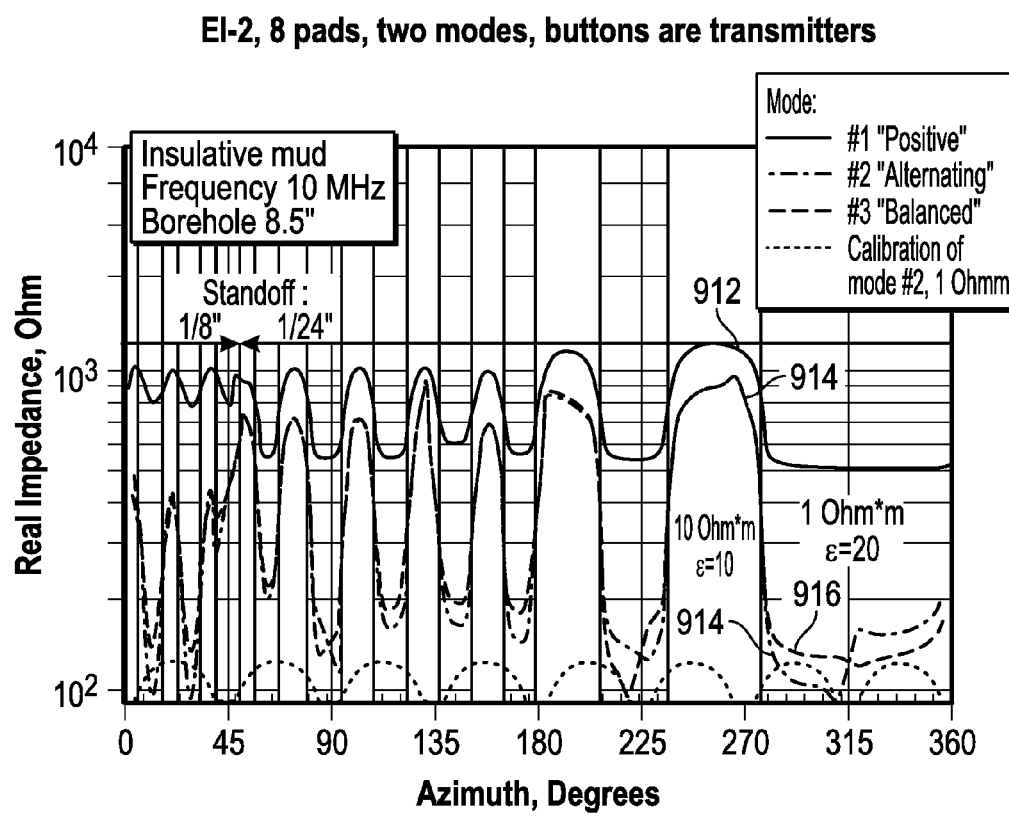

Referring to FIGS. 9A and 9B, another simulation compares azimuthal resolution. It should be noted that proper calibration is needed; for this purpose the response on the alternating mode versus the azimuth had been calculated for homogeneous medium 1 ohm-m and then was used for the calibration. Results have been calibrated by this curve.

For the simulation of FIG. 9A, the formation consists of alternating 1 ohm-m and 10 ohm-m sectors with thicknesses (on the borehole wall) from 0.625" to 3.75", with no vertical dependence. The standoff is again a constant ⅛ inch. Again, it is readily apparent that the alternating mode provides much better resolution than the aligned mode: the dynamic range increased from 2.5 for the aligned mode measurements 902 to 10 for the alternating mode results 904, which is the theoretical limit. The balanced mode results 906 differs from the alternating mode insignificantly—the modulus of the coefficient a is just 0.00012—and are thus virtually indistinguishable.

For the simulation of FIG. 9B, the simulated standoff is uneven. The standoff gap is equal to ⅛ inch for azimuth from 0 degrees to 50 degrees, and to 1/24 inch otherwise. Thus, the first pad has three times greater standoff than all other pads, which imbalances the system. We see that the alternating mode has an artifact—the significant jump of the measured impedance at the azimuth 315 degrees. It can be concluded that the artifact is caused by the uneven standoff. The balanced results 916 now significantly differ from the alternating results 914 (|a|=0.06), and we see that the correction successfully removes the 315 degree artifact.

Figure 10:
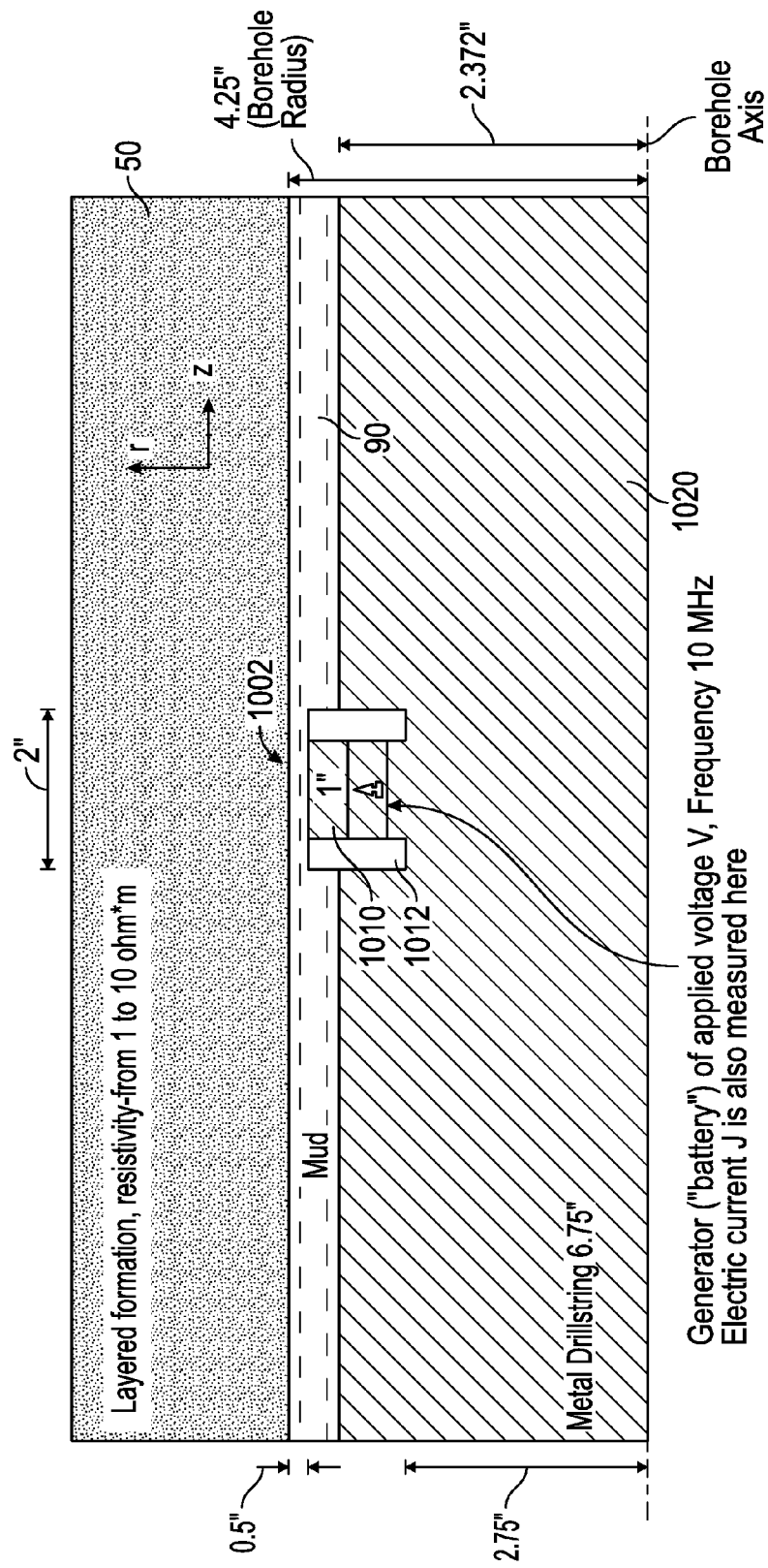
FIG. 10 illustrates a schematic view of another sensor array in accordance with embodiments of the present disclosure.

FIG. 10 illustrates a schematic view of another sensor array in accordance with embodiments of the present disclosure. The sensor array 1002 may be used in connection with measurement-while-drilling (MWD) applications. For example, tool 1000 may include a 6.75 inch drillstring 1004 having two sensors on opposite sides of the mandrel 1020. Each sensor includes a 1 inch square measure electrode 1010 sticking out of the mandrel 1020 a distance of ⅜ inches. Thus, the standoff in a 8.5 inch borehole is 0.5 inches. Measure electrode 1010 may be surrounded by electric insulation 1012. The sensors are of opposite polarity as above.

Figure 11:
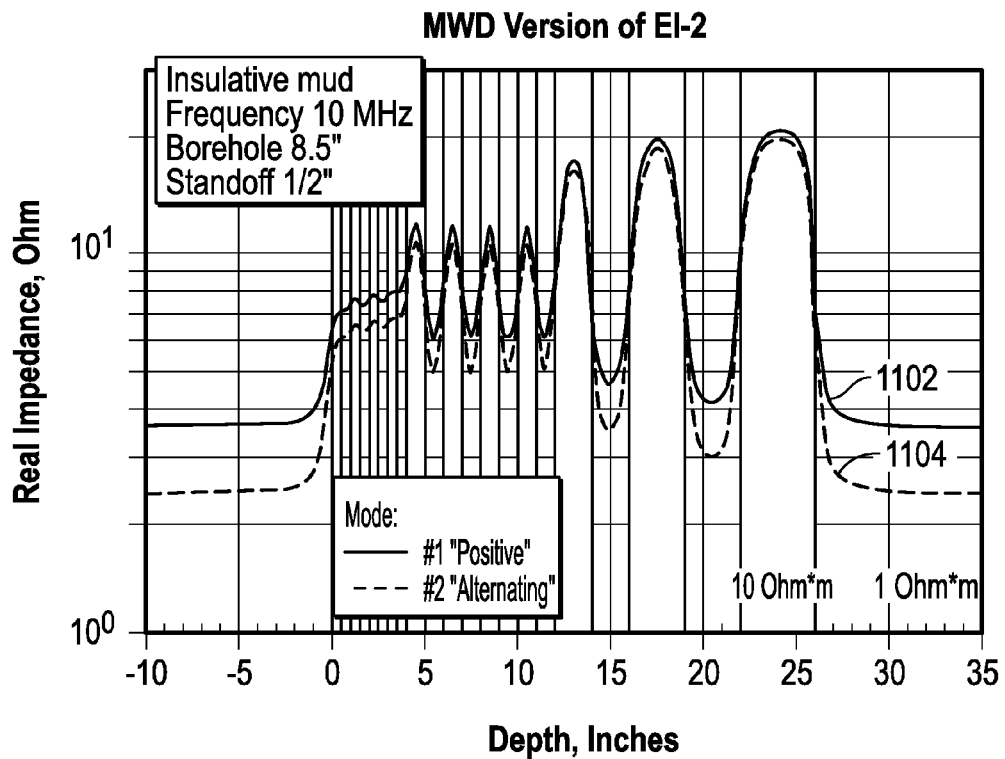
FIG. 11 illustrates a numerical simulation of differences in measured impedance using the alternating mode versus the aligned mode for a single electrode embodiment.

FIG. 11 illustrates a numerical simulation of differences in measured impedance Re $Z_{Button,i}$ using the alternating mode 1104 versus the aligned mode 1102 for the single electrode embodiment. The earth model is the same as FIGS. 5A and 5B. It is apparent that the aligned mode has better resolution than in the wireline case—its dynamic range is now 6, instead the value 1.6 achieved in FIG. 5A—due to a smaller standoff (0.875 inches instead of 2.25 inches). Thus, the corresponding capacitive coupling is proportionally stronger. Consequently, the leakage path is shorter. Again, the alternating mode results 1104 demonstrate better resolution than the aligned mode results 1102. The dynamic range increases from 6 to 9.

Figure 12:
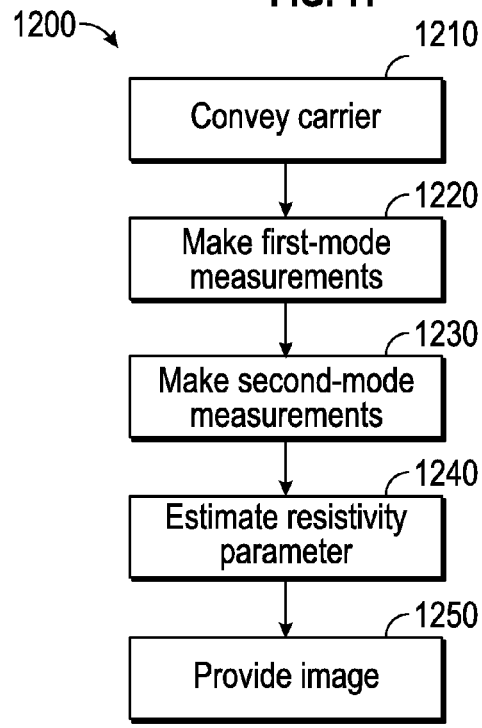
FIG. 12 shows, in flow chart form, one method in accordance with embodiments of the present disclosure for evaluating an earth formation.

FIG. 12 shows, in flow chart form, one method 1200 according to the present disclosure for evaluating an earth formation 80 intersected by a borehole 50 (FIG. 1). Step 1210 includes conveying a carrier into the borehole. Step 1220 includes using the measure electrodes in the plurality of sensor arrays, in a first mode of measurement, to make resistivity measurements indicative of a resistivity parameter of the earth formation. In the first mode, measurement is carried out by applying a first high frequency voltage to each measure electrode in the first set of sensor arrays while making first resistivity measurements; and applying a second high frequency voltage that is different from the first high frequency voltage to each measure electrode in the second set of sensor arrays while making second resistivity measurements. These measurements may be performed simultaneously.

Optional step 1230 may include using the measure electrodes in the plurality of sensor arrays, in a second mode of measurement, to make further resistivity measurements indicative of the resistivity parameter of the earth formation by applying a third high frequency voltage to each measure electrode in the first set of sensor arrays and the second set of sensor arrays while making third resistivity measurements. The third voltage may be the same as either the first or second voltage.

Optional step 1240 includes using the first resistivity measurements, the second resistivity measurements, and the third resistivity measurements to estimate the resistivity parameter. For example, this may be carried out by estimating an impedance at a particular measure electrode in dependence upon a linear combination of a first sensed current in the particular measure electrode in the first mode and a second sensed current in the particular measure electrode in the second mode. Additionally, it may include estimating an impedance at the particular measure electrode in dependence upon a linear combination of a first voltage applied to the particular measure electrode in the first mode and a second voltage applied to the particular measure electrode in the second mode. Optional step 1250 includes using resistivity measurements to provide an image of the resistivity parameter.

Herein, the term "information" may include, but is not limited to, one or more of: (i) raw data, (ii) processed data, and (iii) signals. The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. By "high-frequency" it is meant a frequency of at least 1 MHz, although in some embodiments a frequency higher than 1 MHz, higher than 5 MHz, or higher than 10 MHz, may be desirable. Terms such as "first," "second," "third," and so on are used as indicators, and do not denote an order.

Referring again to FIG. 1, certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method for evaluating an earth formation intersected by a borehole using a carrier associated with measure electrodes on a plurality of sensor arrays including a first set of sensor arrays and a second set of sensor arrays, wherein each sensor array of the plurality of sensor arrays includes at least one measure electrode of the measure electrodes, the method comprising:
   conveying the carrier into the borehole; and
   using the measure electrodes, in a first mode of measurement, to make first current measurements indicative of a resistivity parameter of the earth formation, wherein the first current measurements are made by applying a first voltage to each measure electrode in the plurality of sensor arrays while making the first current measurements; and
   using the measure electrodes, in a second mode of measurement, to make further current measurements indicative of the resistivity parameter of the earth formation, comprising:
   applying a second voltage to each measure electrode in the first set of sensor arrays while making second current measurements; and
   applying a third voltage that is the opposite polarity of the second voltage to each measure electrode in the second set of sensor arrays while making third current measurements; and
   combining the first current measurements, the second current measurements, and the third current measurements to simulate a virtual impedance for each measure electrode.

2. The method of claim 1, wherein for any two consecutive sensor arrays around the circumference of the carrier, one of the consecutive sensor arrays is in a different set than the other of the consecutive sensor arrays is in.

3. The method of claim 1, further comprising using the virtual impedance for each measure electrode to estimate the resistivity parameter.

4. The method of claim 1, further comprising using the virtual impedance for each measure electrode to generate an image of the resistivity parameter.

5. The method of claim 1, wherein the first voltage, the second voltage, and the third voltage are each applied at a frequency of at least 1 MHz.

6. The method of claim 1, wherein applying the second voltage and applying the third voltage occur at the same time.

7. The method of claim 1, wherein the first voltage is the same as the second voltage.

8. An apparatus for evaluating an earth formation intersected by a borehole, the apparatus comprising:
   a logging tool configured to be conveyed in a borehole;
   a plurality of sensor arrays, including a first set of sensor arrays and a second set of sensor arrays, wherein each sensor array includes at least one measure electrode;
   a plurality of pads on the logging tool, wherein each pad comprises a pad body and at least one sensor array of the plurality of sensor arrays; and
   at least one processor configured to:
   use the measure electrodes on the plurality of sensor arrays, in a first mode of measurement, to make first current measurements indicative of a resistivity parameter of the earth formation, wherein the first current measurements are made by applying a first voltage to each measure electrode in the plurality of sensor arrays while making the first current measurements;
   use the measure electrodes on the plurality of sensor arrays, in a second mode of measurement, to make further current measurements indicative of the resistivity parameter of the earth formation, comprising:
   applying a second voltage to each measure electrode in the first set of sensor arrays while making second current measurements; and
   applying a third voltage that is the opposite polarity of the second voltage to each measure electrode in the second set of sensor arrays while making third current measurements; and
   combine the first current measurements, the second current measurements, and the third current measurements to simulate a virtual impedance for each measure electrode.

9. The apparatus of claim 8, wherein for any two consecutive sensor arrays around the circumference of the carrier, one array is in a different set than the other array is in.

10. The apparatus of claim 8, wherein the at least one processor is further configured to use the virtual impedance for each measure electrode to provide an image of the resistivity parameter.

11. The apparatus of claim 8, wherein the at least one processor is configured to apply each of the first voltage, the second voltage, and the third voltage at a frequency of at least 1 MHz.

12. The apparatus of claim 8, wherein the at least one processor is configured to apply the second voltage and the third voltage at the same time.

13. The apparatus of claim 8, wherein the first voltage is the same as the second voltage.

14. An apparatus for making measurements of a parameter of interest of an earth formation during drilling of a borehole therein, the apparatus comprising:
 - a drill bit conveyed on a bottom hole assembly (BHA) for drilling the borehole;
 - a tool body associated with the BHA;
 - a plurality of sensor arrays on the tool body, including a first set of sensor arrays and a second set of sensor arrays, wherein each sensor array includes at least one measure electrode; and
 - at least one processor configured to:
 - use the measure electrodes on the plurality of sensor arrays, in a first mode of measurement, to make first current measurements indicative of a resistivity parameter of the earth formation, wherein the first current measurements are made by applying a first voltage to each measure electrode in the plurality of sensor arrays while making the first current measurements;
 - use the measure electrodes on the plurality of sensor arrays, in a second mode of measurement, to make further current measurements indicative of the resistivity parameter of the earth formation, comprising:
 - applying a second voltage to each measure electrode in the first set of sensor arrays while making second current measurements; and
 - applying a third voltage that is the opposite polarity of the second voltage to each measure electrode in the second set of sensor arrays while making third current measurements; and
 - combine the first current measurements, the second current measurements, and the third current measurements to simulate a virtual impedance for each measure electrode.

15. The apparatus of claim 14, wherein for any two consecutive sensor arrays around the circumference of the tool body, one array is in a different set than the other array is in.

16. The apparatus of claim 14, wherein the at least one processor is further configured to use the virtual impedance for each measure electrode to provide an image of the resistivity parameter.

* * * * *